US006881097B2

(12) United States Patent
Matsunaga et al.

(10) Patent No.: US 6,881,097 B2
(45) Date of Patent: Apr. 19, 2005

(54) ELECTRICAL CONNECTOR OF AT LEAST TWO-DIRECTION CARD INSERTION TYPE

(75) Inventors: Akihiro Matsunaga, Tachikawa (JP); Keiichiro Suzuki, Kodaira (JP); Akira Natori, Fussa (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 10/375,201

(22) Filed: Feb. 27, 2003

(65) Prior Publication Data

US 2003/0162416 A1 Aug. 28, 2003

(30) Foreign Application Priority Data

Feb. 28, 2002 (JP) ........................................ 2002-053792

(51) Int. Cl.⁷ .............................................. H01R 24/00
(52) U.S. Cl. ...................................................... 439/630
(58) Field of Search ............................... 439/630, 631, 439/945, 64; 361/737; 235/380, 379, 341

(56) References Cited

U.S. PATENT DOCUMENTS 4,262,986 A   4/1981  Cherian et al.
6,106,336 A * 8/2000  Phan ........................... 439/631
6,454,164 B1 * 9/2002  Wakabayashi et al. ....... 235/380
2001/0049231 A1 * 12/2001 Bricaud ....................... 439/630

FOREIGN PATENT DOCUMENTS

EP    1 162 699 A1   12/2001
EP    1 349 240 A2   10/2003
JP    200036349       2/2000

OTHER PUBLICATIONS

European Search Report, European Application No. EP 03 00 4081, Dated Jul. 6, 2004.

* cited by examiner

Primary Examiner—J. F. Duverne
(74) Attorney, Agent, or Firm—Michael Best & Friedrich LLP

(57) ABSTRACT

An electrical connector (1) comprises an insulator (10) having an upper surface (13) and a plurality of contacts (20) each having a contact portion (21). The contacts (20) are held by the insulator (10) so that the contact portions (21) project from the upper surface (13) of the insulator (10). Each contact (20) further comprises first to third guide portions (23, 22, 24) which extend downwardly and diagonally across the upper surface (13) of the insulator (10) in different directions. Terminating ends (23a, 22a, 24a) of the first to the third guide portions (23, 22, 24) are laid below the upper surface (13) of the insulator (10).

7 Claims, 9 Drawing Sheets

US 6,881,097 B2

ELECTRICAL CONNECTOR OF AT LEAST TWO-DIRECTION CARD INSERTION TYPE

BACKGROUND OF THE INVENTION

This invention relates to an electrical connector (which will only be referred to as "connector" hereinafter) a multi-direction card insertion type which is connected with the card, such as an SIM (Subscriber Identify Module) card for a mobile telephone. Such a card has a surface on which contacts or contact plates are formed.

One type of connectors for an SIM card comprises an insulator having a surface on which contacts are arranged. A connector of the type further comprises a cover which surrounds the surface of the insulator with a gap between the cover and the surface of the insulator. An SIM card is inserted into the connector of the type, namely, the gap between the cover and the surface of the insulator. Instead of the cover, another connector of the type is arranged near a plate, e.g. a part of a housing of a telephone, with a gap between the plate and the surface of the insulator. In the arrangement, an SIM card is inserted not into the connector itself but into the gap between the plate and the surface of the insulator so that the contacts of the SIM card are in contact with the contacts of the connector. In the present application, the insertion of an SIM card means that the contacts of the SIM card are forced to be in contact with the contacts of a connector. For example, an expression "an SIM card is inserted into a connector" is also used in a situation that the SIM card is slid on the surface of the insulator in order that the contacts of the SIM card and the contacts of the connector are brought into contact with each other. In this connection, a term "an insertion direction of the SIM card" includes the meaning of "a slide direction of the SIM card." Another term "a direction" means "one way direction", unless otherwise specified. For example, a right-to-left direction is normally different from a left-to-right direction in the present application.

There are multi-direction insertion type connectors each of which is designed to allow an SIM card to be able to be inserted into the connector in the multi-directions. A designer of a mobile telephone may arrange a multi-direction insertion type connector within the mobile telephone so that an SIM card can be inserted into the connector in the multi-directions. Also, he/she may select one insertion direction among the possible directions and may arrange a multi-direction insertion type connector within the mobile telephone so as to use only the selected insertion direction. A multi-direction insertion type connector can therefore provide flexibility for design of a mobile telephone, especially, arrangement of the connector within the mobile telephone. Such a connector is disclosed for example in JP-A 2000-36349.

Each of contacts of an existing connector is designed so as to have guide portions in four directions, which can guide insertions of an SIM card in the respective directions. The number of insertion directions of an SIM card into a connector is determined by an arrangement of the contacts on the connector. For example, if contacts are arranged on a connector in one or more lines regularly, the number of insertion directions of an SIM card becomes four.

SUMMARY OF THE INVENTION

It is an object of the present invention to improve an existing multi-direction insertion type connector, especially, in an aspect of manufacturing process with respect to contacts included therein.

According to the inventors' consideration, the reduction of the number of guide portions of each contact makes it possible to raise the possibility of various improvements of a multi-direction insertion type connector, although the number of insertion directions might become lower. The present invention is based on the consideration.

According to this invention, there is provided an electrical connector (1, 60) for a card inserted and connected thereto, which comprises an insulator (10, 70) having an upper surface (13, 73) and a plurality of contacts (20, 80) held in the insulator (10, 70), each of the contacts (20, 80) having contact portion (21, 81) projecting from the upper surface (13, 73), each of the contacts (20, 80) further having only three guide portions (22, 23, 24, 82, 83, 84) each of which extends downwardly and diagonally so as to be across the upper surface (13, 73), the contacts (20, 80) being arranged so that the card (5) can be inserted into the connector (1, 60) in at least two directions.

The three guide portions (23, 22, 24) may have terminating ends (23a, 22a, 24a), respectively, which are laid below the upper surface (13) of the insulator (10).

In an embodiment, at least two of the contacts (20) are arranged parallel to each other and spaced from each other in a first direction. Each of the at least ones of the contacts (20) comprises first to third guide portions (23, 22, 24). The first guide portion (23) extends from the contact portion (21) in a second direction opposite to the first direction. The second guide portion (22, 24) extends from the contact portion (21) in a third direction perpendicular to the first direction; and the third guide portion (24, 22) extends from the contact portion (21) in a fourth direction perpendicular to the first direction and opposite to the third direction. Specifically, the contacts (20) are grouped and arranged into two lines, which are parallel lines spaced from each other in the third direction and extending in the first direction. Each of the contacts (20) comprises the first to third guide portions (23, 22, 24) so that the card (5) can be inserted into the connector (1) in the first, the third and the fourth directions.

In another embodiment, at least two of the contacts (80) are arranged parallel to each other and spaced from each other in a first direction. Each of the at least ones of the contacts (80) comprises first to third guide portions (82, 83, 84). The first guide portion (82, 83) extends from the contact portion (81) in the first direction. The second guide portion (83, 82) extends from the contact portion (81) in a second direction opposite to the first direction, and the third guide portion (84) extends from the contact portion (81) in a third direction perpendicular to the first direction. Specifically, the contacts (80) are grouped and arranged into two lines, which are parallel lines paced in the third direction and extending in the first direction; each of the contacts (80) belonging to one of the two lines comprises the first to third guide portions (82, 83, 84) while each of the other contacts (80) comprises the first and the second guide portions (83, 82) and further comprises a fourth guide portion (84) instead of the third guide portion (84). The fourth guide portion (84) extends from the contact portion (81) in a fourth direction perpendicular to the first direction and opposite to the third direction, so that the card (5) can be inserted into the connector (60) in the first and the second directions.

DESCRIPTION OF PREFERRED EMBODIMENTS

Figure 1:
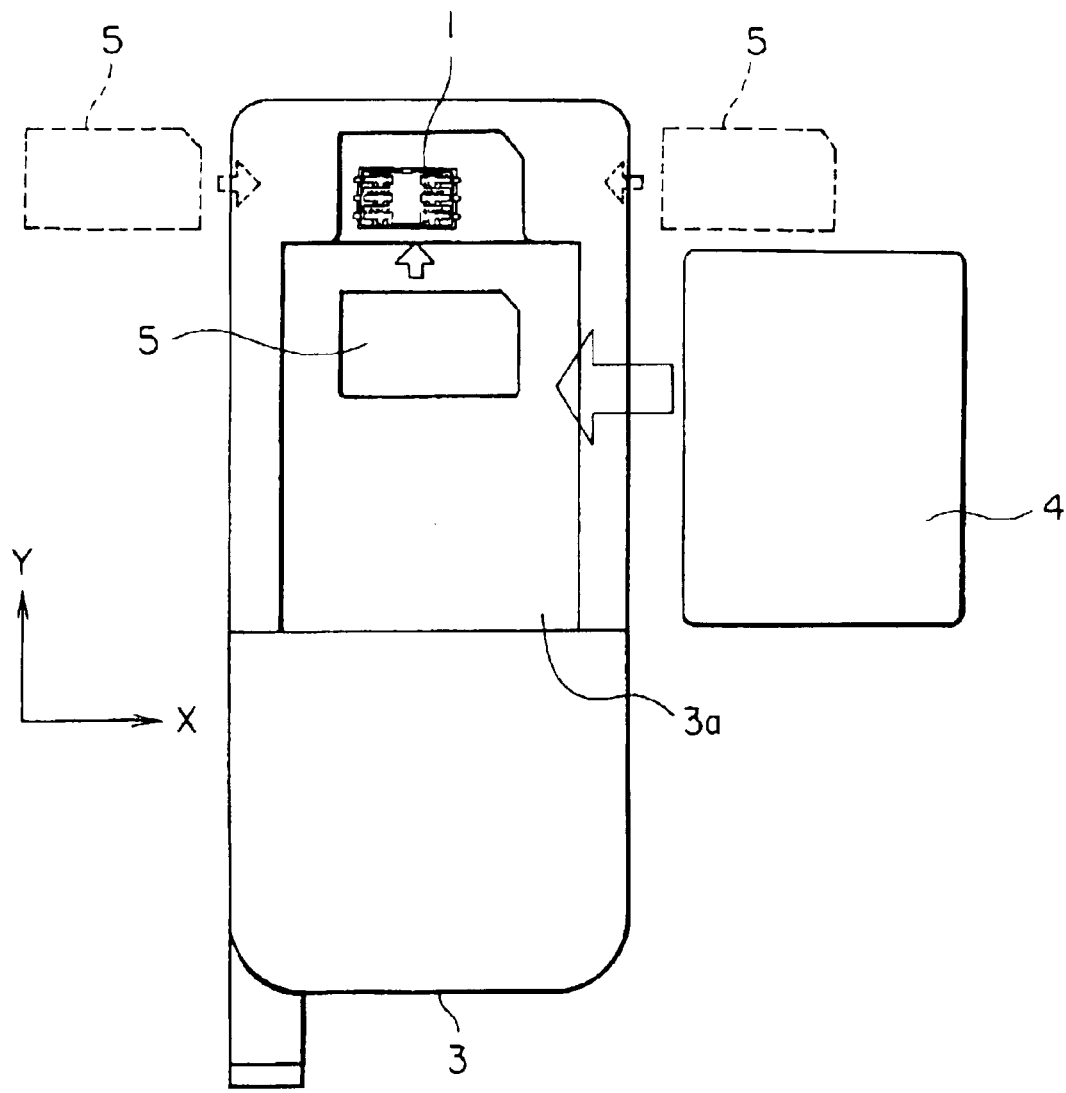
FIG. 1 is a plan view showing an example of a mobile telephone within which a connector according to a first embodiment of the present invention can be arranged.

With reference to FIG. 1, a connector 1 according to a first embodiment of the present invention is installed within a mobile telephone 3 and is connectable to an SIM card 5 for the mobile telephone 3. An installation of the SIM card 5 within the mobile telephone 3 usually comprises the following steps of: inserting the SIM card 5 into the connector 1, specifically, into a gap between a surface of the connector 1 and a plate which is not shown; fitting a battery 4 within a battery-accommodation portion 3a provided for the mobile telephone 3; and fitting to the mobile telephone 3 a rear cover which is not shown.

Figure 2:
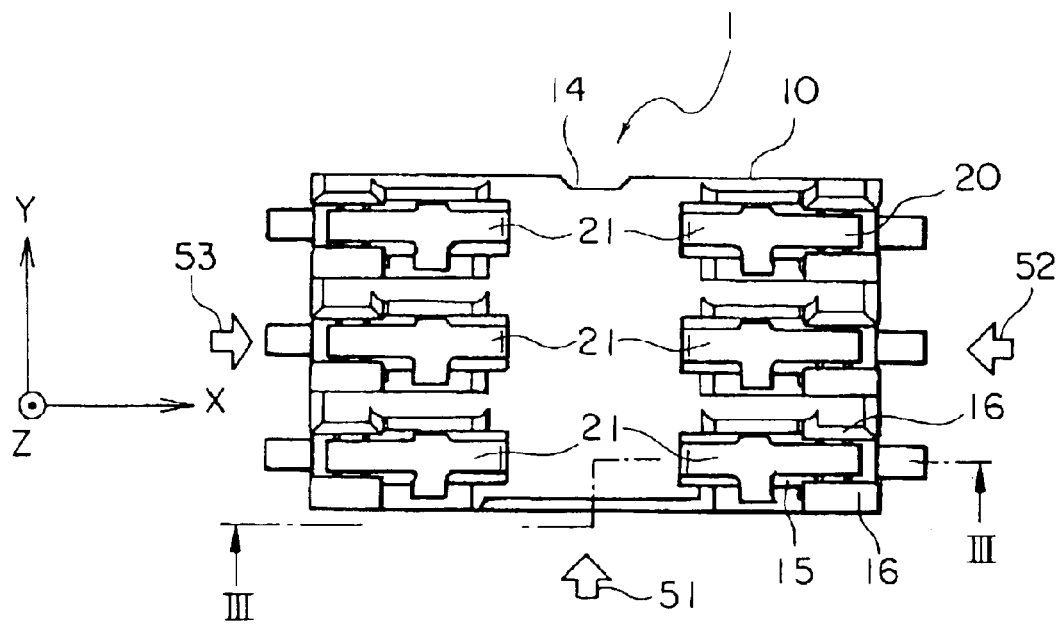
FIG. 2 is a top plan view of the connector illustrated in FIG. 1.

The illustrated connector 1 is arranged within the mobile telephone 3 so that the SIM card 5 can be inserted into the connector 1 only in a Y-direction. However, the connector 1 is designed so as to receive the SIM card 5 also in either an X-direction perpendicular to the Y-direction or an opposite or reverse direction of the X-direction, as shown in FIG. 1 with broken lines. Therefore, the connector 1 can be arranged within the mobile telephone 3 in a different orientation, and also, the mobile telephone 3 can be modified so that the SIM card 5 can be inserted into the connector 5 in two or three directions. Hereinafter, the Y-direction, the opposite direction of the X-direction, and the X-direction are also referred to as first to third insertion directions 51 to 53, respectively, as shown in FIG. 2.

With reference to FIG. 2 to FIG. 5, the connector 1 of this embodiment comprises an insulator 10 and a plurality of contacts 20 each having a contact portion 21. The insulator 10 comprises a main base 11 and leg portions 12 supporting the main base 11. The main base 11 has an upper surface 13 in a Z-direction perpendicular to the X- and the Y-directions. The leg portions 12 extend from a lower surface of the main base 11 downwardly in the Z-direction, and bottoms of the leg portions 12 are disposed on a printed circuit board, which is not shown.

The main base 11 is provided with a key 14 for indicating which direction is an opposite direction of the first insertion direction 51 (namely, Y-direction). In this embodiment, the key 14 is a notch or depression, which is formed on a back surface of the insulator 1 as seen along the Y-direction and which is depressed in the opposite direction of the first insertion direction 51. The SIM card 5 cannot be inserted into the connector 1 in the opposite direction of the Y-direction, namely, in a direction from the surface, on which the key 14 is formed, to a front surface (an opposite surface of the surface on which the key 14 is formed), as described above with reference to FIG. 1. According to the key 14, a manufacturer can dispose the connector 1 within the mobile telephone 3 without any mistakes.

Figure 3:
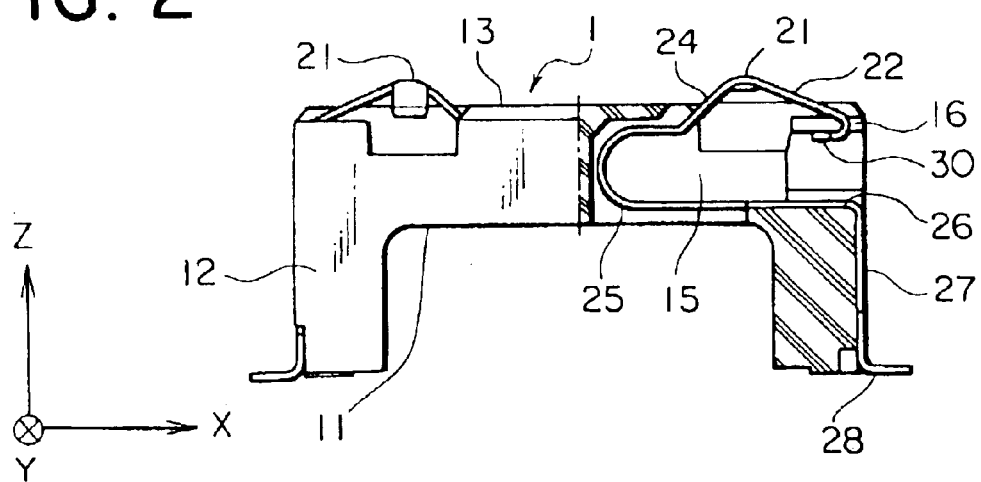
FIG. 3 is a front view of the connector illustrated in FIG. 1, wherein the connector is cut off taken along lines III—III of FIG. 2.
Figure 4:
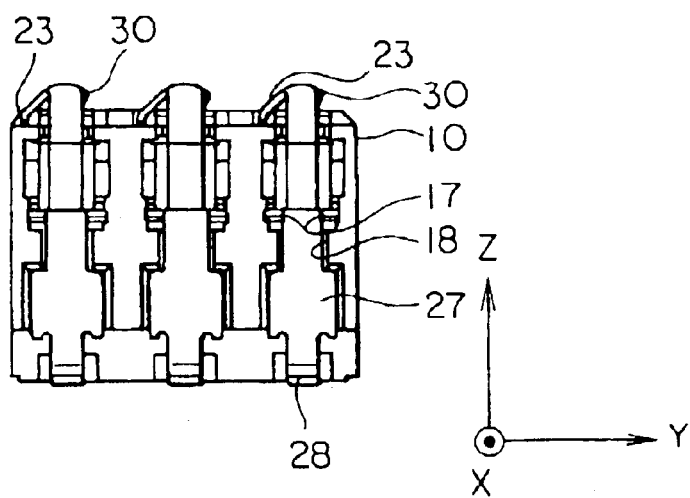
FIG. 4 is a side view of the connector illustrated in FIG. 1.

The main base 11 is also provided with a plurality of contact-accommodation portions 15, each of which is, for example, a recess which communicates with the lower surface, the upper surface 13 and a side surface of the main base 11, as shown in FIG. 3. The contact-accommodation portions 15 are arranged within the main base 11 in two lines of the three contact-accommodation portions 15. The contact-accommodation portions 15 partially accommodate the respective contacts 20 to arrange the contacts 20 in the insulator 10. Each of the contact-accommodation portions 15 is provided with two lateral projections 16, which project toward each other in the Y direction as seen from FIGS. 2 and 3. Within the contact-accommodation portion 15, a first groove 17 is formed, as shown in FIG. 4. The first groove 17 partially receives a corresponding one of the contacts 20. On the side surfaces of the leg portions 12, second grooves 18 are formed, as shown in FIG. 4. The second grooves 18 are formed integral with the respective first grooves 17 so as to partially receive the respective contacts 20.

As described above, the contacts 20 are held by the insulator 10. Because of the arrangement of the contact-accommodation portions 15, the contacts 20 are also arranged in two lines of the three contacts 20, namely, a right-hand line and a left-hand line in FIG. 2. In this arrangement, the contact portions 21 of the contacts 20 project from the upper surface 13 of the insulator 10, as seen from FIG. 3. In either the right-hand or the left-hand lines, the three contacts 20 are spaced from each other in the Y-direction. The right-hand and the left-hand lines are parallel lines spaced from each other in the X-direction.

Figure 5:
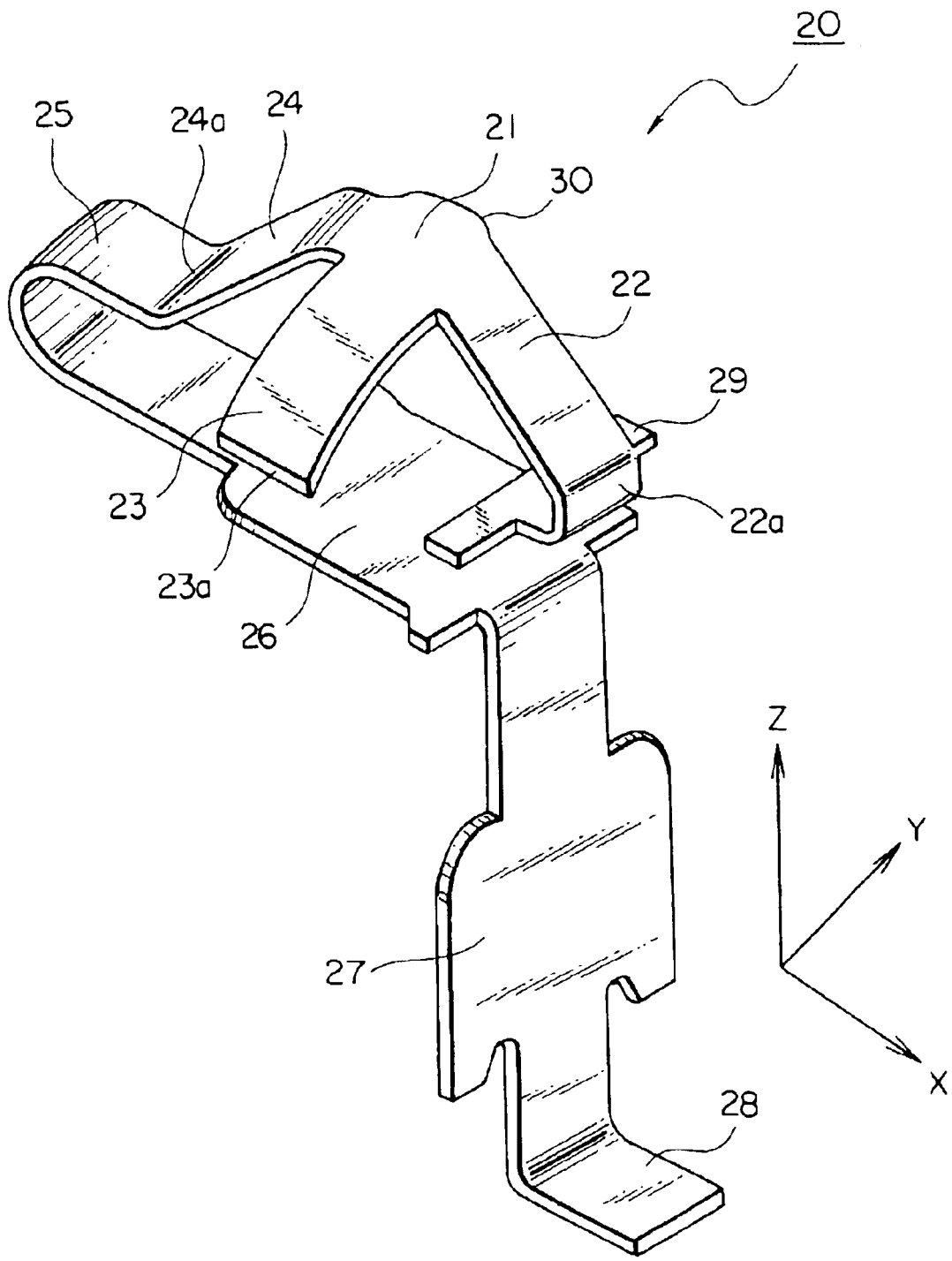
FIG. 5 is a perspective view of a contact included in the connector of FIG. 1.

Each contact 20 belonging to the right-hand line has a shape illustrated in FIG. 5. Each of the other contacts 20 belonging to the left-hand line has a shape symmetrical with the shape of FIG. 5. Also, the contacts 20 of the right-hand line and the contacts 20 of the left-hand line are arranged symmetrical with each other. An explanation of the contact 20 is hereinafter made in detail about only the contact 20 belonging to the right-hand line.

The contact 20 comprises three guide portions 22 to 24, which show a T-like shape as seen from above thereof in the Z-direction, namely, as shown in FIG. 2. The guide portions 22, 23, 24 extend from the contact portion 21 downwardly in the Z-direction and diagonally across the upper surface 13 of the insulator, as shown in FIGS. 3 and 4. In detail, the guide portions 22, 23, 24 extend in the X-direction, the opposite direction of the Y-direction, and the opposite direction of the X-direction, respectively. In other words, the guide portions 22, 23, 24 extend in the third insertion direction 53, the opposite direction of the first insertion direction 51 and the second insertion direction 52, respectively. Terminating ends 22a, 23a, 24a of the guide portions 22, 23, 24 are laid below the upper surface 13 of the insulator 10 when the contact 20 is fitted into a corresponding one of the contact accommodating portions 15 of the insulator 10 to form the connector.

From the terminating end 24a of the guide portion 24, a U-like shaped portion 25 continues. The U-like shaped portion 25 mainly provides a spring function for the contact 20. The spring function allows the contact portion 21 to be laid on or below the upper surface 13 of the insulator 10 when the SIM card 5 is inserted into the connector 1. Because the force by the spring function always goes upwards in the Z-direction, the spring function also makes it sure that the contact portion 21 is in contact with the contact plate formed on the surface of the SIM card 5.

From the U-like shaped portion 25, a first held portion 26, a second held portion 27 and an end portion 28 continue in this order. The first and the second held portions 26, 27 are connected to each other so as to form a 90° angle. The first held portion 26 has a part wider in the Y-direction and is fitted within the first groove 17 formed with the contact-accommodation portion 15 of the insulator 10, as shown in FIG. 4. The second held portion 27 also has a part wider in the Y-direction and is fitted within the second groove 18 formed on the side surface of the insulator 10, as shown in FIG. 4. The end portion 28 is laid on the same level as the bottom of the leg portion 12 and is connected, for example by soldering, with a circuit pattern which is formed on the printed circuit board.

With the guide portion 22 of the contact 20, a fixed portion 29 is formed integrally, as especially shown in FIG. 5. The fixed portion 29 goes from the terminating end 22a of the guide portion 22 toward in the opposite direction of the X-direction, namely, in the second insertion direction 52. The fixed portion 29 has a wider shape than the guide portion 22 in the Y-direction and is engaged with the lateral projections 16 of the insulator 10 when the contact 20 is partially accommodated in the contact-accommodation portion 15 of the insulator 10.

The contact 20 is further provided with a small projection 30, which project downwardly in the Z-direction and diagonally across the Y- and the Z-directions but does not reach the upper surface 13 of the insulator 10, as shown in FIG. 4. The small projection 30 provides the contact portion 21 with a partially spherical surface, together with the guide portions 22, 23, 24.

Figure 6:
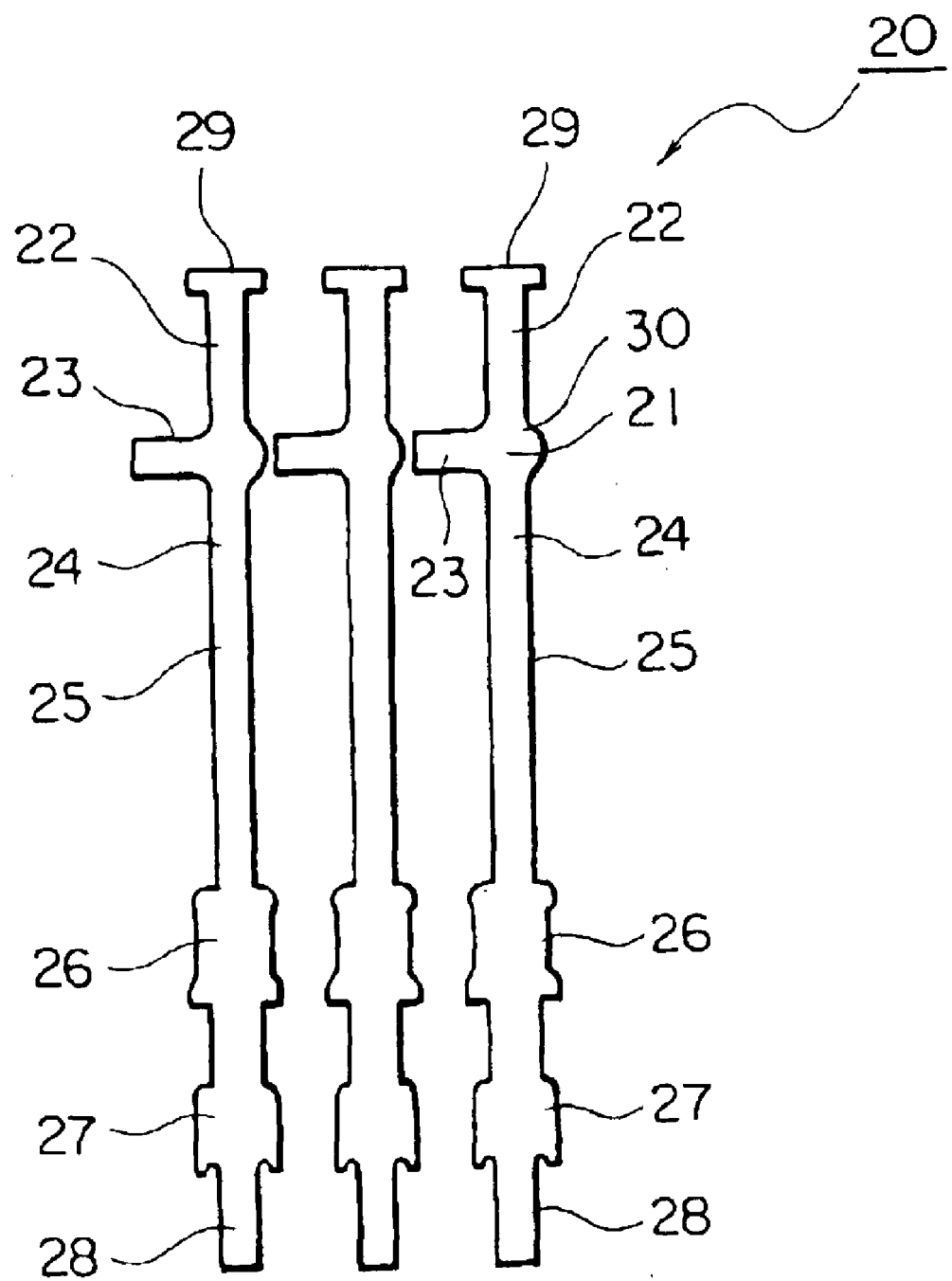
FIG. 6 is a plan view of contact blanks stamped out from a metal plate, which blanks are included in the connector of FIG. 1.
Figure 7:
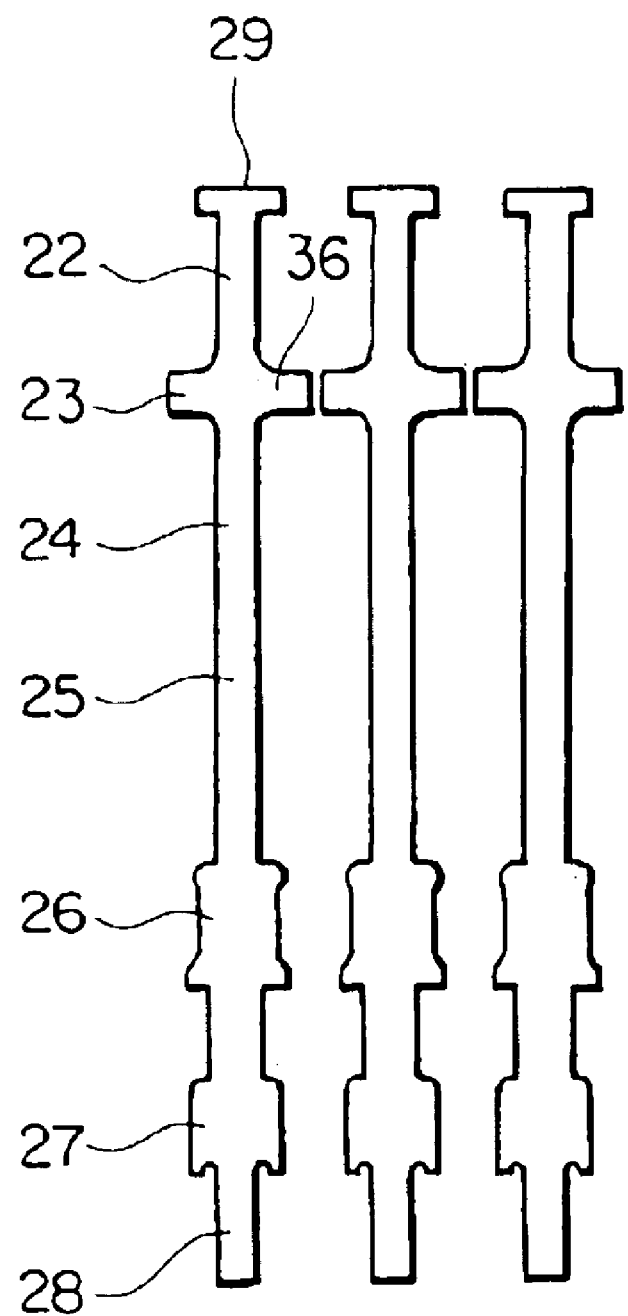
FIG. 7 is a plan view illustrating contact blanks in the existing multi-direction insertion type connector and being used for a description about an advantage of the contacts of FIG. 6.

With reference to FIGS. 6 and 7, one of advantages of the present embodiment is described below. FIG. 6 shows a set of blanks of the contacts 20 which are obtained by stamping out a metal plate at the same pitch as the pitch of the contacts 20 actually fitted within the insulator 10. FIG. 7 shows an example set of blanks of existing contacts each of which has four guide portions further including a guide portion 30'. In FIG. 7, the contact blanks are obtained by stamping out a metal plate at the same pitch as the pitch of the contacts 20. In other words, the blanks of the contacts 20 shown in FIG. 6 and the blanks of the contacts shown in FIG. 7 have the same pitch.

Under the above conditions, the present embodiment can make the guide portion 23 longer. For high reliability and good productivity, the metal plate is stamped into the contact blanks with predetermined spaces between adjacent blanks of the contacts. Therefore, the length of the guide portion 23 is determined by the length of the portion 30, 30'. If the contact has four guide portions 22, 23, 24, 30', the length of the guide portion 23 is restricted by the length of the guide portion 30'. In the present embodiment, each of the contacts 20 has the decreased number of the guide portions 22, 23, 24, namely, three guide portions 22, 23, 24. The portions 30 are much smaller than the respective guide portions 23 which are formed at the opposite sides of the portions 30 in the Y-direction. Therefore, the length of the guide portion 23 can be made longer. The long guide portion 23 can provide the guide portion 23 with a gentle slope, therefore, with a smoother guide function of the insertion of the SIM card in the first insertion direction 51. Instead, the position of the contact portion 21 can be set higher because of the long guide portion 23.

Figure 8:
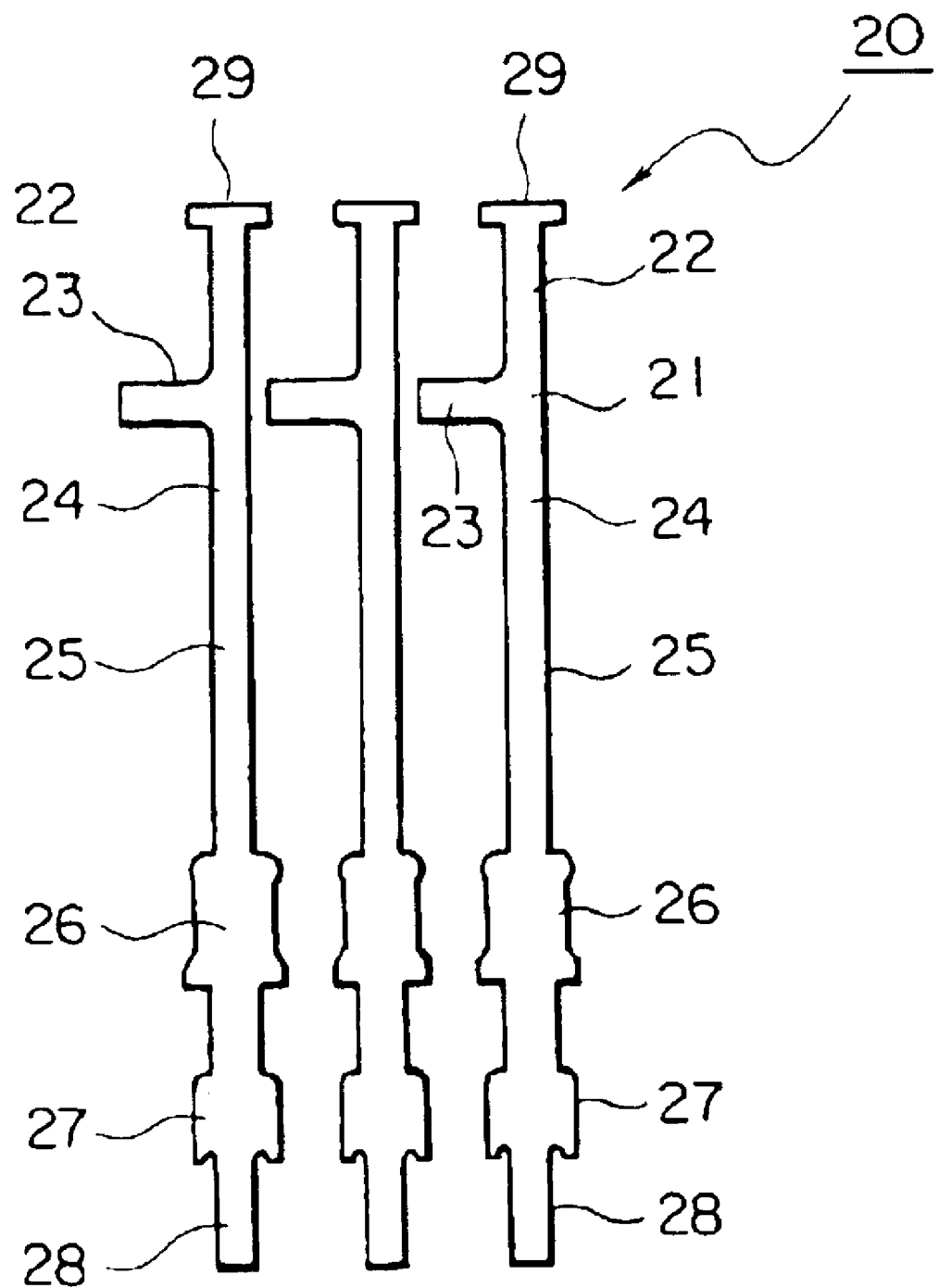
FIG. 8 is a plan view of another contact blanks, which are modification of the contacts of FIG. 6.

The small portions 30 of the first embodiment may be removed as shown in FIG. 8. If desired, the contacts 20' shown in FIG. 8 can have the longer guide portions 23 because the lengths of the guide portions 23 are not restricted by even the lengths of the small portions 30, which are not provided for the contacts 20'. The contact 20' has a more partially spherical surface because of no small portion 30. A designer of the connector 1 can select the contact 20 or the contact 20', taking advantages thereof into consideration.

Figure 9:
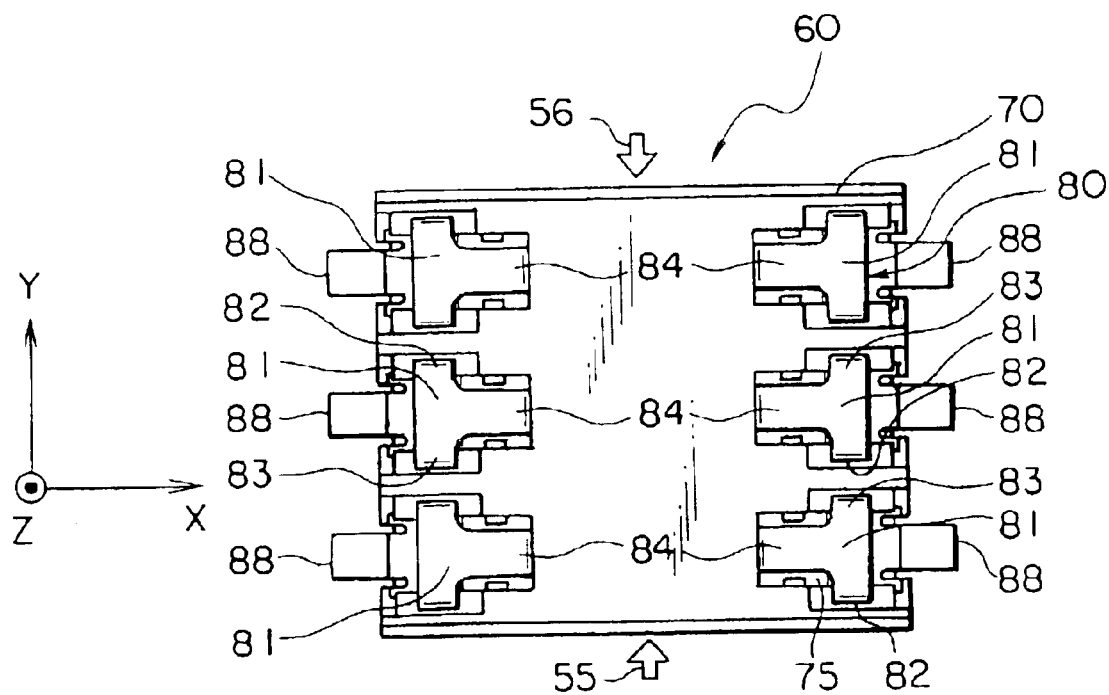
FIG. 9 is a top plan view showing a connector according to a second embodiment of the present invention.
Figure 10:
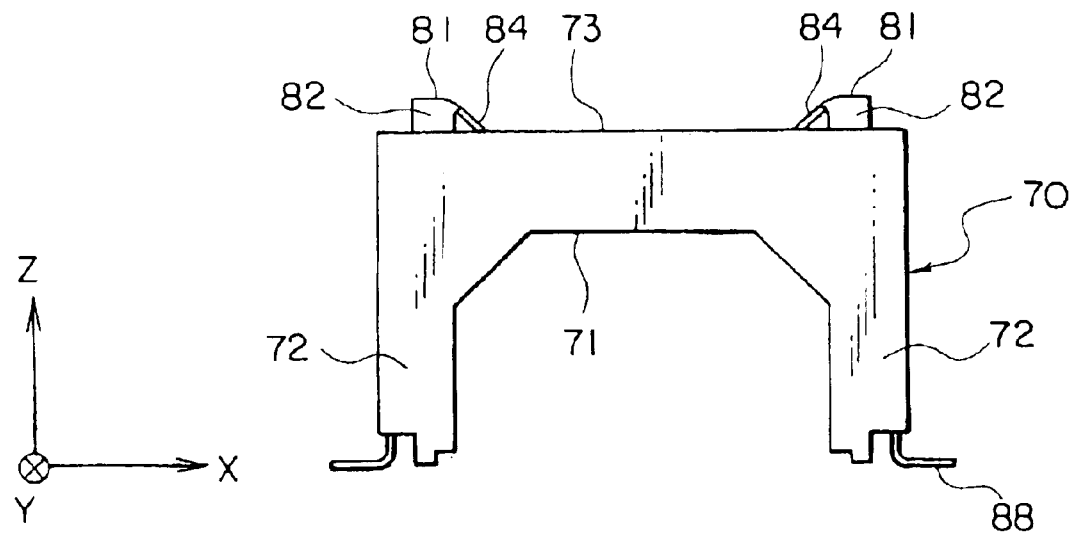
FIG. 10 is a front view of the connector illustrated in FIG. 9.
Figure 11:
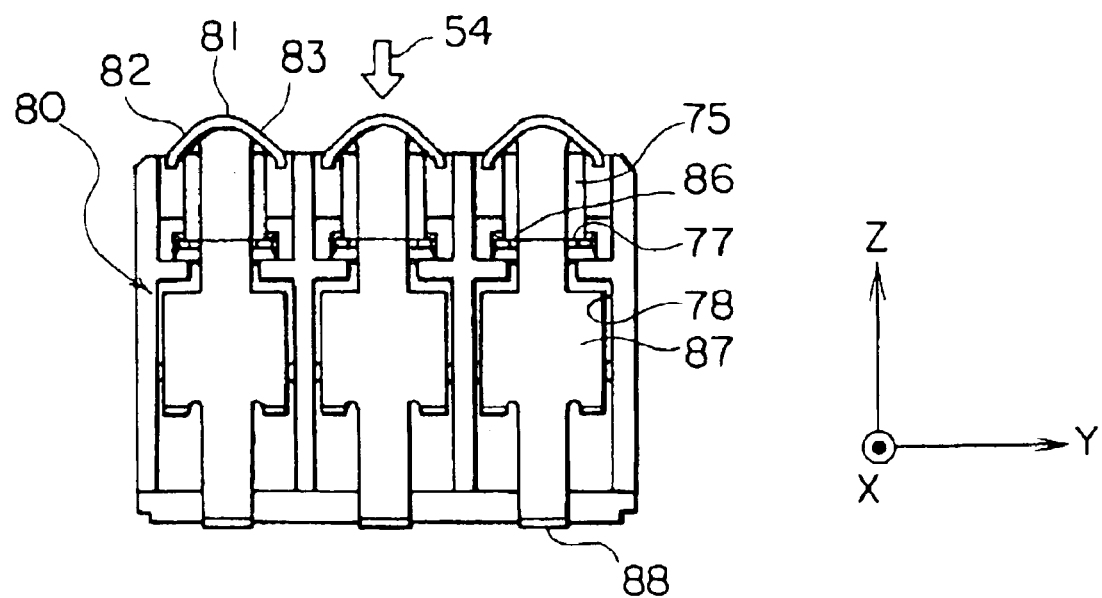
FIG. 11 is a side view of the connector illustrated in FIG. 9.

With reference to FIGS. 9 to 13, the connector 60 comprises an insulator 70 and a plurality of contacts 80 each having a contact portion 81. The connector 60 is arranged within the mobile telephone 3 in a similar way of FIG. 1. However, the connector 60 is designed so that the other possible insertion directions of the connector 60 are different from the insertion direction shown in FIG. 1. All of the possible insertion directions of the connector 60 are shown in FIGS. 9 and 11 with hollow arrows 55, 56, 54, which are referred to as first to third insertion directions, respectively.

The insulator 70 comprises a main base 71 and leg portions 72 supporting the main base 71. The main base 71 has an upper surface 73 in the Z-direction. The leg portions 72 extend from a lower surface of the main base 71 downwardly in the Z-direction, and bottoms of the leg portions 72 are disposed on a printed circuit board, which is not shown.

Figure 13:
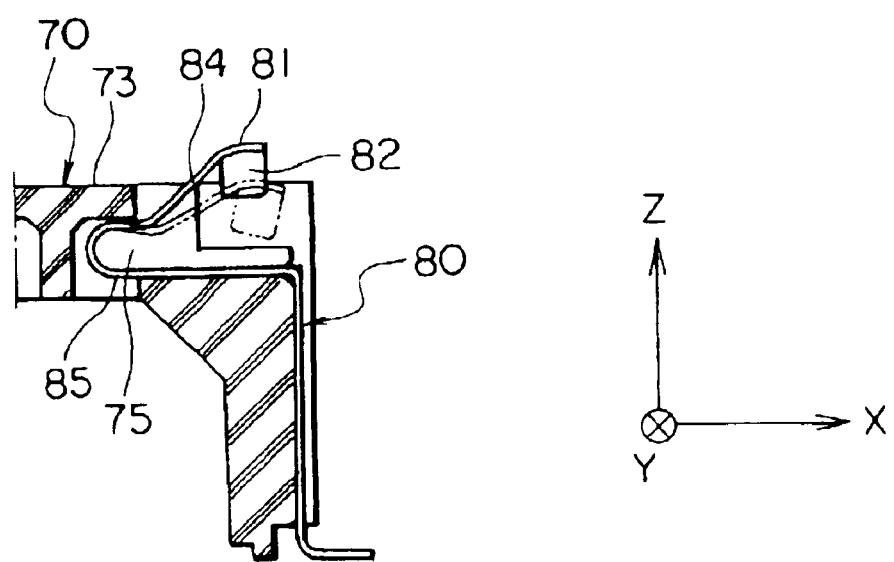
FIG. 13 is a partial, cross-sectional view of the connector illustrated in FIG. 9.
Figure 12:
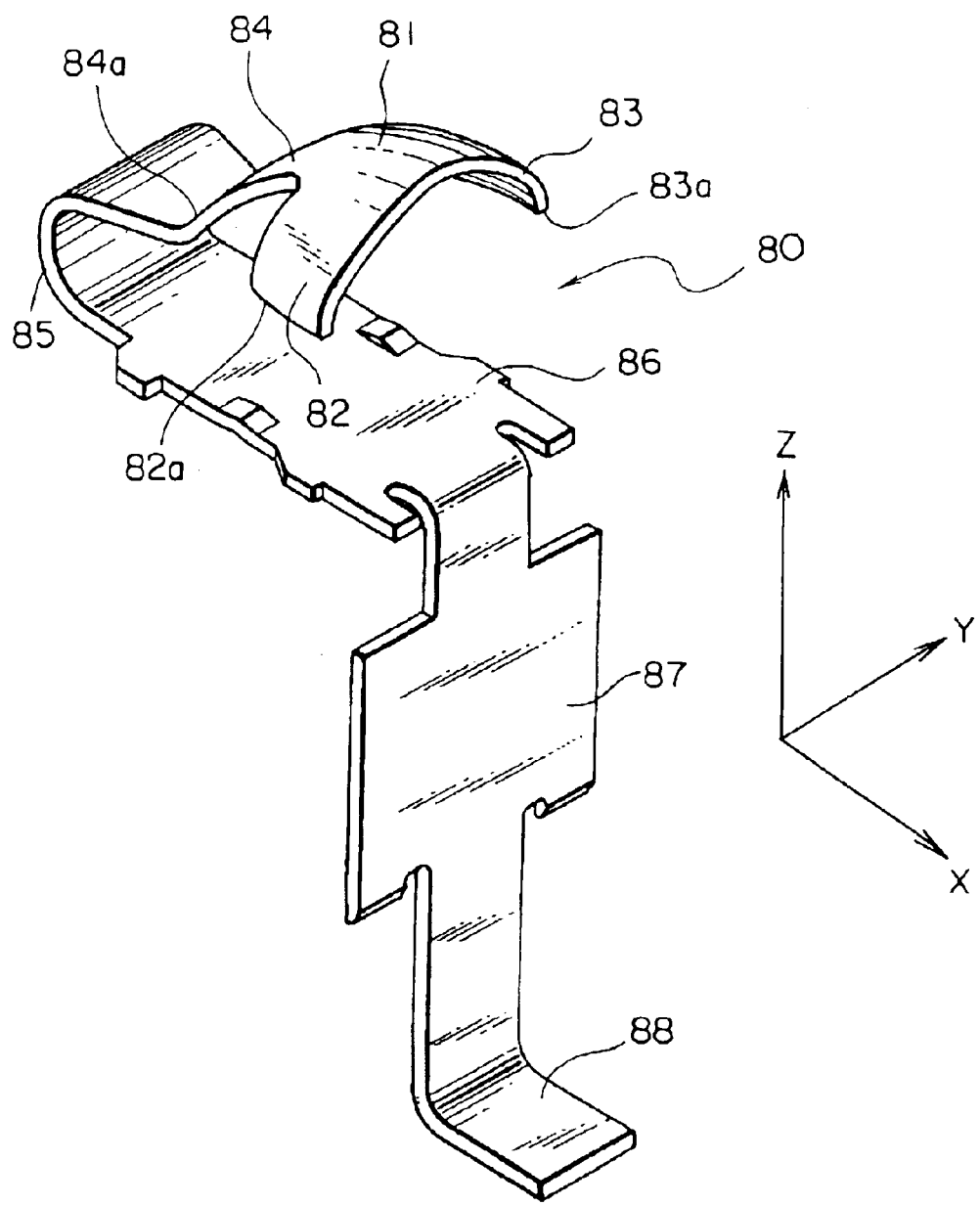
FIG. 12 is a perspective view of a contact included in the connector of FIG. 9.

The main base 71 is provided with a plurality of contact-accommodation portions 75, each of which is for example a recess which communicates with the lower surface, the upper surface 73 and a side surface of the main base 71, as shown in FIG. 13. The contact-accommodation portions 75 are arranged within the main base 71 in two lines of the three contact-accommodation portions 75. The contact-accommodation portions 75 partially accommodate the respective contacts 80 to arrange the contacts 80 in the insulator 70. Within the contact-accommodation portion 75, a first groove 77 is formed, as shown in FIG. 11. The first groove 77 partially receives a corresponding one of the contacts 80. On the side surfaces of the leg portions 72, second grooves 78 are formed, as shown in FIG. 11. The second grooves 78 are formed integral with the respective first grooves 77 so as to partially receive the respective contacts 80.

The contacts 80 are held by the insulator 70. Because of the arrangement of the contact-accommodation portions 75, the contacts 80 are also arranged in two lines of the three contacts 80, namely, a right-hand line and a left-hand line in FIG. 9. In this arrangement, the contact portions 81 of the contacts 80 project from the upper surface 73 of the insulator 70, as seen from FIGS. 11 and 13. In either the right-hand or the left-hand lines, the three contacts 80 are spaced from each other in the Y-direction. The right-hand and the left-hand lines are parallel lines spaced from each other in the X-direction.

In this embodiment, all of the contacts 80 have the same shape and the same structure. However, the contacts 80 of the right-hand line and the contacts 80 of the left-hand line are arranged symmetrically with each other. Therefore, all of the directions are made reverse with respect to the contacts of both lines. Hereinafter, an explanation of the contact 80 is made in detail about only the contact 80 belonging to the right-hand line.

The contact 80 comprises three guide portions 82 to 84, which show a T-like shape as seen from above thereof in the Z-direction, namely, as shown in FIG. 9. The guide portions 82, 83, 84 extend from the contact portion 81 downwardly in the Z-direction and diagonally across the upper surface 73 of the insulator 10, as shown in FIGS. 11 and 13. In detail, the guide portions 82, 83, 84 extend in the opposite direction of the Y-direction, the Y-direction and the opposite direction of the X-direction, respectively. In other words, the guide portions 82, 83, 84 extend in the second insertion direction 56, the first insertion direction 55 and a direction perpendicular to the first insertion direction 55 and to the second insertion direction 56, respectively. Terminating ends 82a, 83a, 84a of the guide portions 82, 83, 84 are laid below the upper surface 73 of the insulator 70 when the contact 80 is fitted with the insulator 70.

From the terminating end 84a of the guide portion 84, a U-like shaped portion 85 continues. The U-like shaped portion 85 mainly provides a spring function for the contact 80. The spring function allows the contact portion 81 to be laid on or below the upper surface 73 of the insulator 70 when the SIM card 5 is inserted into the connector 60, as shown in FIG. 13. Because the force by the spring function always goes upwards in the Z-direction, the spring function also makes it sure that the contact portion 81 is in contact with the contact plate formed on the surface of the SIM card 5.

From the U-like shaped portion 85, a first held portion 86, a second held portion 87 and an end portion 88 continue in this order. The first and the second held portions 86, 87 are connected to each other so as to form a 90° angle. The first held portion 86 has two pairs of projections. Each pair of the projections project in opposite directions, namely, in the first and the second insertion directions 55, 56, respectively, so as not to face each other. The first held portion 86 is fitted within the first groove 77 formed with the contact-accommodation portion 75 of the insulator 10, as shown in FIG. 11. The second held portion 87 has a part wider in the Y-direction and is fitted within the second groove 78 formed on the side surface of the insulator 70, as shown in FIG. 11. The end portion 88 is laid on the same level as the bottom of the leg portion 72 and is connected, for example by soldering, with a circuit pattern which is formed on the printed circuit board.

In this embodiment, the contact 80 has only three guide portions 82 to 84. Therefore, a total length of a blank of the contact 80 stamped out from a metallic plate can be shorter than that of the conventional contact having four guide portions. Instead, the position of the contact portion 81 can be set higher.

Although the above-mentioned embodiments are directed to the connectors for SIM cards, the present invention is applicable to connectors for any cards on a surface of each of which a plurality of contacts or contact plates are formed.

What is claimed is:

1. An electrical connector for a card inserted and connected thereto, comprising an insulator having an upper surface and a plurality of contacts held in the insulator, each of the contacts having contact portion projecting from the upper surface, each of the contacts further having only three guide portions each of which extends downwardly and diagonally so as to be across the upper surface, the contacts being arranged so that the card can be inserted into the connector in at least two directions, and the first to the three guide portions have terminating ends, respectively, which are laid below the upper surface of the insulator, wherein each of the contacts has a T-like shape as seen from above thereof.

2. An electrical connector for a card inserted and connected thereto, comprising an insulator having an upper surface and a plurality of contacts held in the insulator, each of the contacts having contact portion projecting from the upper surface, each of the contacts further having only three guide portions each of which extends downwardly and diagonally so as to be across the upper surface, the contacts being arranged so that the card can be inserted into the connector in at least two directions, and the first to the three guide portions have terminating ends, respectively, which are laid below the upper surface of the insulator, wherein at least two of the contacts are arranged parallel to each other and spaced from each other in a first direction; each of the at least ones of the contacts comprises first to third guide portions; the first guide portion extends from the contact portion in a second direction opposite to the first direction; the second guide portion extends from the contact portion in a third direction perpendicular to the first direction; and the third guide portion extends from the contact portion in a fourth direction perpendicular to the first direction and opposite to the third direction.

3. The electrical connector according to claim 2, wherein the contacts are grouped and arranged into two lines, which are parallel lines spaced from each other in the third direction and extending in the first direction; each of the contacts comprises the first to third guide portions so that the card can be inserted into the connector in the first, the third and the fourth directions.

4. The electrical connector according to claim 3, wherein the insulator is provided with a key indicating which direction is the second direction.

5. The electrical connector according to claim 4, wherein the key is a notch which is formed on a back surface of the insulator as seen along the first direction and which is depressed in the second direction.

6. An electrical connector for a card inserted and connected thereto, comprising an insulator having an upper surface and a plurality of contacts held in the insulator, each of the contacts having contact portion projecting from the upper surface, each of the contacts further having only three guide portions each of which extends downwardly and diagonally so as to be across the upper surface, the contacts being arranged so that the card can be inserted into the connector in at least two directions, and the first to the three guide portions have terminating ends, respectively, which are laid below the upper surface of the insulator, wherein at least two of the contacts are arranged parallel to each other and spaced from each other in a first direction; each of the at least ones of the contacts comprises first to third guide portions; the first guide portion extends from the contact portion in the first direction; the second guide portion extends from the contact portion in a second direction opposite to the first direction; and the third guide portion extends from the contact portion in a third direction perpendicular to the first direction.

7. The electrical connector according to claim 6, wherein the contacts are grouped and arranged into two lines, which are parallel lines paced in the third direction and extending in the first direction; each of the contacts belonging to one of the two lines comprises the first to third guide portions while each of the other contacts comprises the first and the second guide portions and further comprises a fourth guide portion instead of the third guide portion; the fourth guide portion extends from the contact portion in a fourth direction perpendicular to the first direction and opposite to the third direction, so that the card can be inserted into the connector in the first and the second directions.

* * * * *